US009819057B2

(12) United States Patent
Suh et al.

(10) Patent No.: US 9,819,057 B2
(45) Date of Patent: Nov. 14, 2017

(54) RECHARGEABLE LITHIUM BATTERY

(71) Applicant: Samsung SDI Co., Ltd., Yongin-si, Gyeonggi-do (KR)

(72) Inventors: Seung Bum Suh, Yongin-si (KR); Ho-Seok Yang, Yongin-si (KR); Maeng-Eun Lee, Yongin-si (KR); Dai-In Park, Yongin-si (KR); Jee-Won Kang, Yongin-si (KR); Jin-Hyunk Lim, Yongin-si (KR); Hee-Yeon Hwang, Yongin-si (KR); Yun-Hee Kim, Yongin-si (KR); Kyeong-Beom Cheong, Yongin-si (KR); Seon-Hong Lee, Yongin-si (KR); Ho-Gon You, Yongin-si (KR); Alexey Kashaev, Yongin-si (KR); Dae-Yup Shin, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 549 days.

(21) Appl. No.: 13/830,119

(22) Filed: Mar. 14, 2013

(65) Prior Publication Data
US 2014/0072865 A1 Mar. 13, 2014

Related U.S. Application Data

(60) Provisional application No. 61/698,311, filed on Sep. 7, 2012.

(51) Int. Cl.
*H01M 10/42* (2006.01)
*H01M 10/0567* (2010.01)
(Continued)

(52) U.S. Cl.
CPC ... *H01M 10/4235* (2013.01); *H01M 10/0567* (2013.01); *H01M 4/62* (2013.01); *H01M 10/052* (2013.01); *H01M 2300/0042* (2013.01)

(58) Field of Classification Search
USPC .............. 429/188–189, 301–347, 199–207, 429/208–246
See application file for complete search history.

(56) References Cited

U.S. PATENT DOCUMENTS 4,789,442 A * 12/1988 Nakagawa ............. C25B 3/105
205/347
8,445,143 B2 5/2013 Kim et al.
(Continued)

FOREIGN PATENT DOCUMENTS

| CN | 101521297 A | 9/2009 |
| CN | 102067257 A | 5/2011 |

(Continued)

OTHER PUBLICATIONS

EPO Search Report dated Jul. 8, 2013, for corresponding European Patent application 13137121.6, (8 pages).
(Continued)

*Primary Examiner* — Kaity Chandler
(74) *Attorney, Agent, or Firm* — Lewis Roca Rothgerber Christie LLP

(57) ABSTRACT

A rechargeable lithium battery includes a compound represented by Chemical Formula 1:
(Continued)

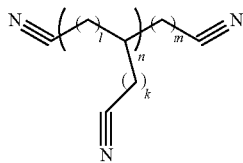

Chemical Formula 1

In Chemical Formula 1, each of k, l, and m is independently an integer of 0 to 20, n is an integer of 1 to 7, and k, l and m are selected such that the compound of Chemical Formula 1 has an asymmetrical structure. The compound of Chemical Formula 1 may be included in the positive electrode, the negative electrode, or the electrolyte of the rechargeable lithium battery.

17 Claims, 5 Drawing Sheets
(3 of 5 Drawing Sheet(s) Filed in Color)

(51) Int. Cl.
  *H01M 4/62* (2006.01)
  *H01M 10/052* (2010.01)

(56) References Cited

U.S. PATENT DOCUMENTS

| | | | |
|---|---|---|---|
| 2002/0055045 | A1 | 5/2002 | Michot et al. |
| 2005/0194562 | A1 | 9/2005 | Lavoie, Jr. et al. |
| 2008/0102369 | A1 | 5/2008 | Sakata et al. |
| 2008/0251754 | A1* | 10/2008 | Michot et al. ............... 252/62.2 |
| 2008/0311481 | A1 | 12/2008 | Kim et al. |
| 2009/0206299 | A1 | 8/2009 | Michot et al. |
| 2009/0214938 | A1 | 8/2009 | Yamamoto et al. |
| 2010/0035146 | A1 | 2/2010 | Fujii et al. |
| 2010/0053847 | A1* | 3/2010 | Tani ........................ H01G 9/035 361/505 |
| 2011/0056563 | A1 | 3/2011 | Bari |
| 2011/0059356 | A1 | 3/2011 | Ogasawara et al. |
| 2012/0313591 | A1* | 12/2012 | Brambilla ........... C01B 31/0233 320/166 |
| 2013/0316252 | A1* | 11/2013 | Lee ..................... H01M 10/056 429/332 |

FOREIGN PATENT DOCUMENTS

| | | |
|---|---|---|
| JP | 11-171853 | 6/1999 |
| JP | 2001-527505 A | 12/2001 |
| JP | 2009-032653 | 2/2009 |
| JP | 2009-158464 | 7/2009 |
| JP | 2009-231261 A | 10/2009 |
| JP | 2010-73367 A | 4/2010 |
| KR | 10-2008-0037574 A | 4/2008 |
| KR | 10-2009-0095577 A | 9/2009 |
| KR | 10-2011-0025622 A | 3/2011 |
| WO | WO 97/35332 A1 | 9/1997 |
| WO | WO 2007/066822 A1 | 6/2007 |
| WO | WO 2008/004790 A1 | 1/2008 |

OTHER PUBLICATIONS

Patent Abstracts of Japan, and English machine translation of Japanese Publication 2009-032653 dated Feb. 12, 2009, (66 pages).
Patent Abstracts of Japan, and English machine translation of Japanese Publication 2009-158464 dated Jul. 16, 2009, (56 pages).
SIPO Office Action dated Sep. 26, 2016, with English translation, for corresponding Chinese Patent Application No. 201310373097.6 (21 pages).
JPO Office Action dated Jun. 20, 2017, for corresponding Japanese Patent Application No. 2013-185279 (4 pages).
SIPO Office Action, with English translation, dated May 31, 2017, for corresponding Chinese Patent Application No. 201310373097.6 (14 pages).

* cited by examiner

RECHARGEABLE LITHIUM BATTERY

CROSS-REFERENCE TO RELATED APPLICATION

This application claims priority to and the benefit of U.S. Provisional Application No. 61/698,311 filed with the United States Patent and Trademark Office on Sep. 7, 2012, the entire contents of which are incorporated herein by reference.

BACKGROUND

1. Technical Field

This disclosure relates to a rechargeable lithium.

2. Description of the Related Art

Recently, portable electronic devices (such as cell phones, laptop computers, tablet PCs, and the like) are becoming smaller and lighter, increasing the demand for batteries with high-capacity as power sources. In response to this demand, non-aqueous electrolyte rechargeable lithium batteries using non-aqueous electrolytes and transporting lithium ions between positive and negative electrodes have been widely used as rechargeable batteries having high power and high energy density. As the positive active material, the non-aqueous electrolyte rechargeable lithium battery uses an oxide capable of intercalating lithium ions, such as those made from lithium and transition elements, for example, $LiCoO_2$, $LiMn_2O_4$, $LiNi_{1-x}Co_xO_2$ ($0<x<1$), and the like. As the negative active material, the non-aqueous electrolyte rechargeable lithium battery may include artificial or natural graphite for intercalating/deintercalating lithium, a carbon-based material such as hard carbon, or a material capable of alloying with lithium (such as Si, Sn, or the like), and the like. However, the use of portable electronic devices for playing motion pictures, games, and the like is increasing, and the devices tend to consume more electricity when used for these tasks. Thus, portable electronic devices require batteries with high-capacity as power sources. The non-aqueous electrolyte rechargeable lithium battery may achieve high-capacity by 1) increasing the capacity of an active material, 2) increasing the charge voltage, 3) increasing the charge amount of the active material and thus, the charge density, and the like. However, these methods have certain challenges, for example, the method of increasing the charge voltage of an active material decomposes the electrolyte. In particular, when the active material is stored at high temperatures, or is continually charged, the electrolyte may be decomposed and generate gas, thus expanding the battery or increasing internal pressure of the battery. Accordingly, attempts to ensure the safety of the battery have continually been made by using an additive to increase the flash point and delay firing, and to decrease thickness changes, thus improving thermal impact durability.

SUMMARY

One embodiment provides a rechargeable lithium battery having improved thermal impact durability. Another embodiment provides a method of manufacturing a rechargeable lithium battery having improved thermal impact durability. In one embodiment, a rechargeable lithium battery includes a compound represented by the following Chemical Formula 1:

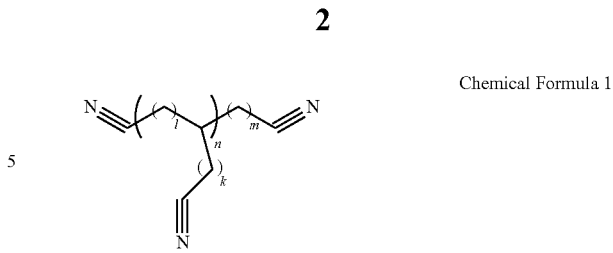

Chemical Formula 1

In Chemical Formula 1, each of k, l, and m is independently an integer of 0 to 20, and k, l and m are selected such that the compound of Chemical Formula 1 has an asymmetric structure. As used herein, the term "asymmetric structure" means that the compound of Chemical Formula 1 is asymmetric about the central carbon atom (i.e., the central carbon atom depicted in the general formula of Chemical Formula 1). In some embodiments, k, l and m are different from one another. In Chemical Formula 1, n is an integer of 1 to 7. For example, in Chemical Formula 1, n may be 1 to 5, and k, l, and m may each be different from one another and may each be independently integers of 0 to 10. In another example, in Chemical Formula 1, n may be 1 to 3, and k, l, and m may each be different from one another and may each be independently integers of 0 to 7. In still another example, in Chemical Formula 1, n may be 1 or 2, k may be 0, and l and m may be different from one another and may be independently integers of 1 to 5. In yet another example, in Chemical Formula 1, n may be 1, k may be 0, l may be 2, and m may be 3. In an exemplary embodiment, the compound represented by Chemical Formula 1 may be HTCN (hexane tricarbonitrile). For example, the compound represented by Chemical Formula 1 may be 1,3,6-hexane tricarbonitrile, 1,3,5-hexane tricarbonitrile, or 2,3,6-hexane tricarbonitrile.

The compound represented by Chemical Formula 1 may be included in a positive electrode for a rechargeable lithium battery. The compound represented by Chemical Formula 1 may be included in an electrolyte for a rechargeable lithium battery. The compound represented by Chemical Formula 1 may be included in a negative electrode for a rechargeable lithium battery. The compound represented by Chemical Formula 1 may be included in the positive electrode, negative electrode or electrolyte an amount of 0.1 to 50%, for example 0.1 to 10%, based on the total weight of the positive electrode, negative electrode, or electrolyte, respectively.

In another embodiment, an electrode composition for a rechargeable lithium battery includes the compound represented by Chemical Formula 1. The composition may be a positive or negative electrode composition for a rechargeable lithium battery. In yet another embodiment, an electrolyte composition for a rechargeable lithium battery includes the compound represented by Chemical Formula 1. In still another embodiment, a method of manufacturing a rechargeable lithium battery includes preparing an electrode composition for a rechargeable lithium battery and applying the electrode composition on an electrode current collector. Accordingly, in one embodiment of the present invention, a rechargeable lithium battery has increased thermal impact durability and thus, improved safety.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention will be better understood by reference to the following detailed description when considered in conjunction with the accompanying drawings, in which:

FIGS. 5(d) and 5(e) are schematic showing that two compounds, 1,3,6-HTCN (1,3,6-hexane tricarbontrile) and 1,2,6-HTCN (1,2,6-hexane tricarbontrile), represented by Chemical Formula 1 according to the present invention, are respectively bonded on the surface of an electrode active material.

DETAILED DESCRIPTION OF THE EMBODIMENTS

Figure 1:
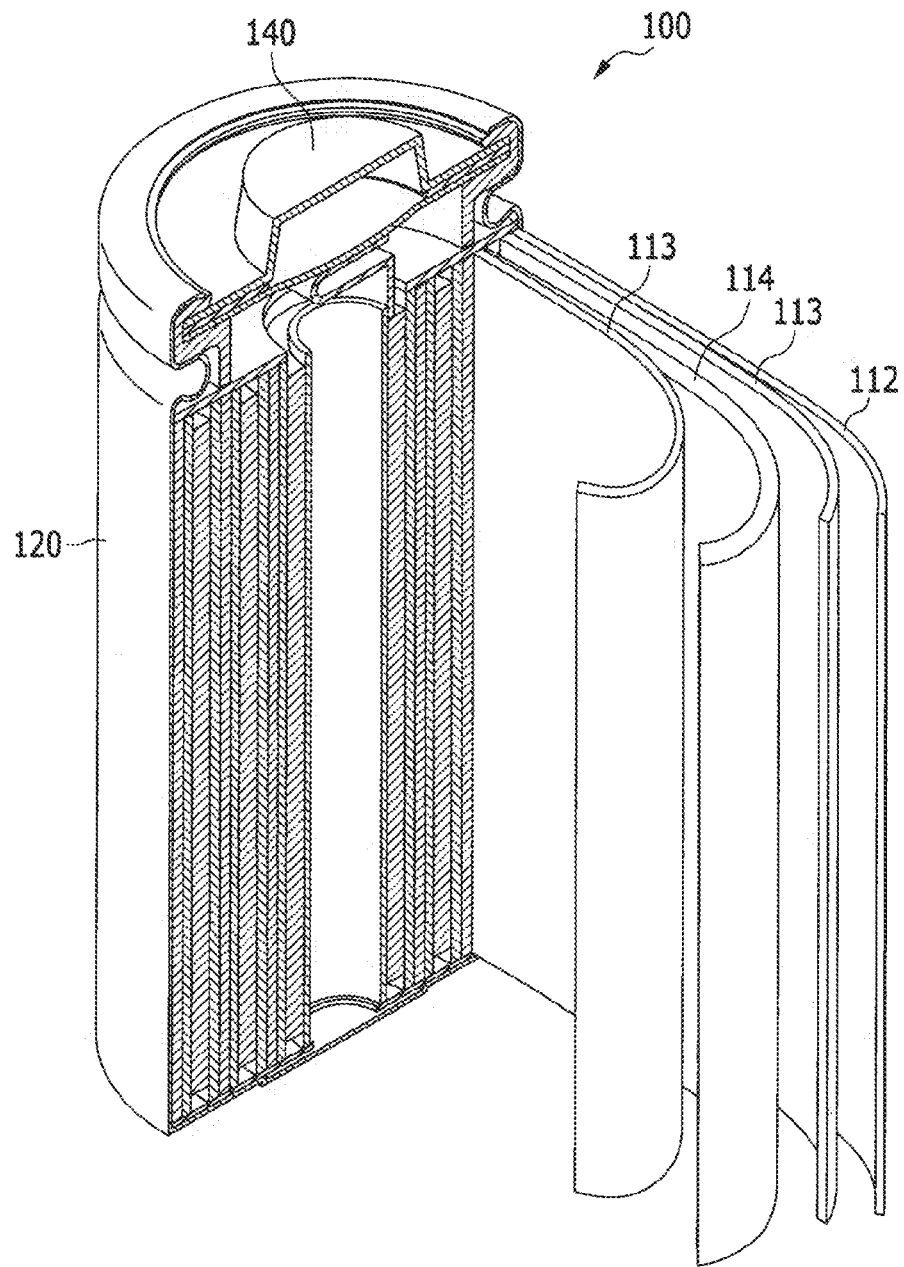
FIG. 1 is an exploded perspective view of a rechargeable lithium battery according to one embodiment.

Exemplary embodiments of the present disclosure will hereinafter be described in detail. However, these embodiments are only exemplary, and this disclosure is not limited thereto.

In one embodiment of the present invention, a rechargeable lithium battery includes a compound represented by the following Chemical Formula 1:

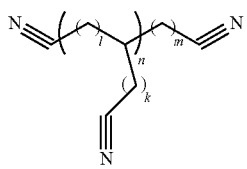

Chemical Formula 1

In Chemical Formula 1, each of k, l, and m is independently an integer of 0 to 20, and k, l and m are selected such that the compound of Chemical Formula 1 has an asymmetric structure. As used herein, the term "asymmetric structure" means that the compound of Chemical Formula 1 is asymmetric about the central carbon atom (i.e., the central carbon atom depicted in the general formula of Chemical Formula 1). In some embodiments, k, l and m are different from one another. In Chemical Formula 1, n is an integer of 1 to 7. For example, in Chemical Formula 1, n may be 1 to 5, and k, l, and m may each be different from one another and may each be independently integers of 0 to 10. In another example, in Chemical Formula 1, n may be 1 to 3, and k, l, and m may each be different from one another and may each be independently integers of 0 to 7. In still another example, in Chemical Formula 1, n may be 1 or 2, k may be 0, and l and m may be different from one another and may be independently integers of 1 to 5. In yet another example, in Chemical Formula 1, n may be 1, k may be 0, l may be 2, and m may be 3.

In an exemplary embodiment, the compound represented by Chemical Formula 1 may be HTCN (hexane Tri-Cyanide). For example, the compound represented by Chemical Formula 1 may be 1,3,6-hexane Tri-Cyanide, or 1,2,6-hexane Tri-Cyanide.

The compound represented by Chemical Formula 1 may be included in a positive electrode for a rechargeable lithium battery. The compound represented by Chemical Formula 1 may be included in an electrolyte for a rechargeable lithium battery. The compound represented by the Chemical Formula 1 may be included in a negative electrode for a rechargeable lithium battery. The compound represented by the above Chemical Formula 1 may be included in the positive electrode, negative electrode or electrolyte in an amount of 0.1 to 50%, for example 0.1 to 10%, based on the total weight of the positive electrode, negative electrode or electrolyte, respectively. In general, when rechargeable lithium batteries have higher capacity (and thus, higher energy density), the rechargeable lithium battery tends to become thicker due to deteriorated internal safety against thermal impact. It is important to minimize this thickness change in the rechargeable lithium battery due to thermal impact, which may determine the thickness of the mobile device (which have been getting thinner and thinner) and prevent destruction of the mobile device.

According to embodiments of the present invention, a rechargeable lithium battery includes the compound represented by Chemical Formula 1, and thus has a reduced thickness change due to thermal impact, and thus has improved thermal impact durability and improved thermal impact safety.

Conventionally, PS (1,3-propane sultone) has been used as an additive for improving the durability of rechargeable lithium batteries against thermal impact. PS is known to improve the thermal safety of the rechargeable lithium battery, and thus the capacity retention at high temperatures. However, PS is a toxic material that may cause cancer. In general, a thermal impact test is performed by heating and cooling a battery 30 times from 80° C. to −40° C. for one hour to apply stress. When the battery is allowed to stand at room temperature after applying stress, and then registers a thickness change that is less than or equal to a predetermined standard, the battery is regarded as having thermal impact safety. According to embodiments of the present invention, a rechargeable lithium battery including the compound represented by Chemical Formula 1 has a decreased thickness change after thermal impact (as mentioned in the following Examples), and thus has improved safety.

The compound represented by Chemical Formula 1 is a hydrocarbon compound including 3 to 9 CN functional groups, for example 3 to 7 CN functional groups, 3 to 5 CN functional groups, or 3 CN functional groups. Without being bound by any particular theory, due to a coordination bond between unshared electron pairs on the N at the terminal end of the CN group and various metals (such as transition elements and the like) of the positive active material, the compound represented by Chemical Formula 1 forms a stable film on the surface of the positive electrode and suppresses a side reaction between the positive electrode and the electrolyte. In addition, the compound is bonded with other materials included in the battery and decomposes the materials and suppresses an exothermic phenomenon, thus suppressing temperature increases in the battery. Furthermore, the compound is bonded with other materials included in the battery and thus blocks formation of a black dot in the battery, and suppresses short circuit due to extraction on the surface of the negative electrode by metal impurities.

Accordingly, the compound represented by Chemical Formula 1 may be included in any of the positive electrode, negative electrode, or electrolyte of the battery, and may improve the durability of the battery against thermal impact.

As illustrated in the following Examples, the compound represented by Chemical Formula 1 (having k, l, m, and n as defined above) has a much lower bonding energy with metal ions in the battery and thus, forms a more stable and stronger bond than a hydrocarbon compound having only two CN functional groups at the terminal end, or a similar compound having a symmetrical structure about the center of the compound having a CN functional group at the terminal end. Accordingly, the compound represented by Chemical Formula 1 more dramatically decreases the thickness change in the battery due to thermal impact.

Figure 3:
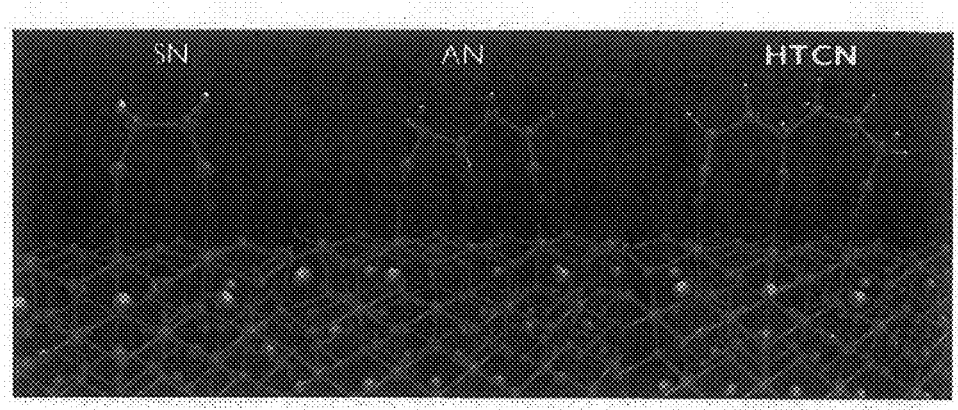
FIG. 3 is a schematic showing that SN (succinonitrile), AN (adiponitrile), and 1,3,6-HTCN (hexane Tri-Cyanide), respectively, are bonded on the surface of an electrode active material.

The effect of decreasing a thickness change may be illustrated with reference to FIGS. 3 to 5. In particular, FIG. 3 is a schematic showing that each SN (succinonitrile), AN (Adiponitrile), and 1,3,6-HTCN (1,3,6-Hexane Tri-Cyanide) is bonded on a surface of an electrode active material. Based on the drawing, 1,3,6-HTCN is more stably bonded on the surface of an electrode active material than SN or AN.

Figure 4:
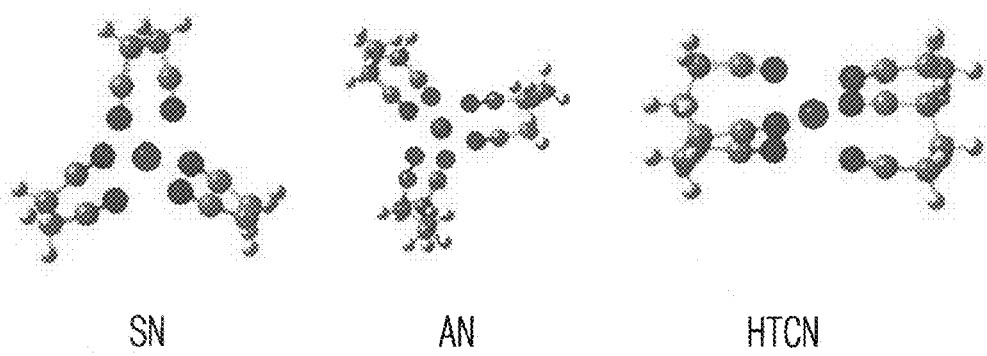
FIG. 4 is a schematic showing that SN (succinonitrile), AN (adiponitrile), and 1,3,6-HTCN (1,3,6-hexane Tri-Cyanide), respectively, have co-ordination bonds with metal ions.

FIG. 4 is a schematic showing that SNs (succinonitriles), ANs (adiponitriles), and 1,3,6-HTCNs (1,3,6-Hexane Tri-Cyanide) have coordinate bonds with a metal ion in the center. As for the 1,3,6-HTCNs (unlike SN or AN), two compounds (each having three CN functional groups) sterically hinder and are bonded to a metal ion in the center. On the contrary, as for the SNs or ANs, three compounds (each having two CN functional groups) surround one metal ion and have coordinate bonds with the metal ion. However, these compounds two dimensionally (not cubically) surround the metal ion, and have coordinate bonds with the metal ion, unlike 1,3,6-HTCN, represented by above Chemical Formula 1.

Figure 5:
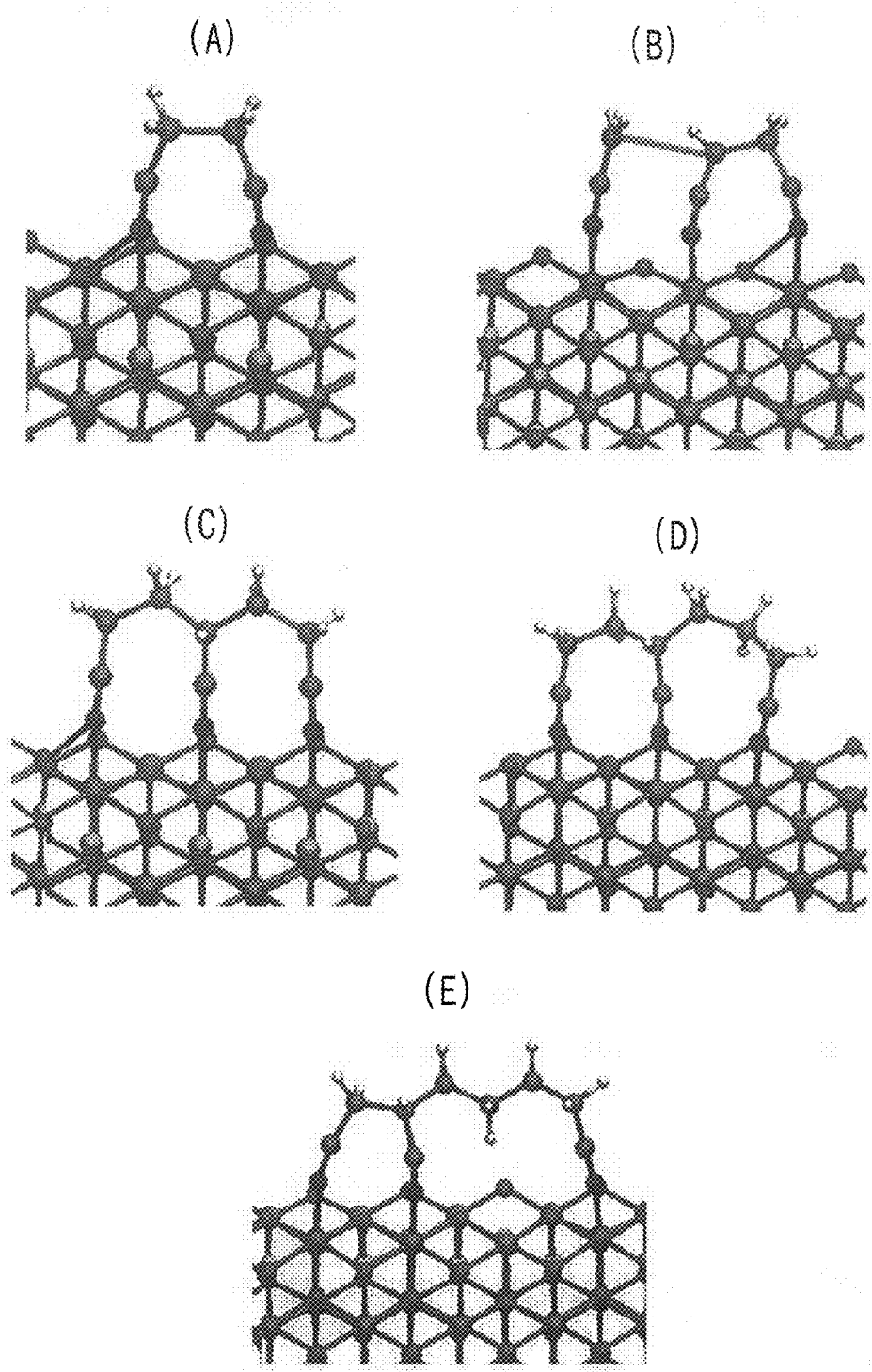
FIGS. 5 (a) to (c) are schematics showing that the compounds having more than two CN functional groups and an overall symmetry structure, i.e., SN (succinonitrile), 1,2,3-PTCN, and 1,3,5-PTCN, are respectively bonded on the surface of an electrode active material.

FIG. 5 is a schematic showing that the compounds, SN (succinonitrile), 1,2,3-PTCN, 1,3,5-PTCN, 1,3,6-HTCN, and 1,2,6-HTCN, are respectively bonded on a surface of an electrode active material. As shown in the following Examples 11 to 14, 1,3,6-HTCN having an asymmetric structure shows stronger adsorption on the surface of an electrode active material than 1,2,3-PTCN or 1,3,5-PTCN (1,3,5-Pentane Tri-Cyanide) having a symmetric structure among compounds having three 3 CN functional groups. When the compound represented by Chemical Formula 1 is included in a positive electrode or a negative electrode for a rechargeable lithium battery, the compound represented by Chemical Formula 1 may be included in a composition for fabricating the positive electrode or the negative electrode.

In another embodiment of the present invention, an electrode composition for a rechargeable lithium battery includes the compound represented by Chemical Formula 1. The composition may be a positive or a negative electrode composition for a rechargeable lithium battery.

In yet another embodiment of the present invention, an electrolyte composition for a rechargeable lithium battery includes the compound represented by Chemical Formula 1.

In still another embodiment of the present invention, a method of manufacturing a rechargeable lithium battery includes preparing an electrode composition for a rechargeable lithium battery and applying the electrode composition on an electrode current collector. According to an embodiment of the present invention, a rechargeable lithium battery may be fabricated by any commonly known method using known materials in the related art, except that the compound represented by Chemical Formula 1 is used.

Rechargeable lithium batteries may be classified into lithium ion batteries, lithium ion polymer batteries, and lithium polymer batteries according to the presence of a separator and the kind of electrolyte used in the battery. Rechargeable lithium batteries may have a variety of shapes and sizes, and include cylindrical, prismatic, or coin-type batteries, and may be thin film batteries or may be rather bulky in size. Structures and fabrication methods for these batteries are known in the art.

FIG. 1 is cross-sectional perspective view of a cylindrical rechargeable lithium battery. Referring to FIG. 1, the rechargeable lithium battery 100 includes a negative electrode 112, a positive electrode 114, and a separator 113 between the negative electrode 112 and positive electrode 114. An electrolyte (not shown) impregnates the negative electrode 112, positive electrode 114, and separator 113. The battery further includes a battery case 120 and a sealing member 140 for sealing the battery case 120. Such a lithium rechargeable battery 100 is fabricated by sequentially stacking the negative electrode 112, separator 113, and positive electrode 114, spiral-winding the stack, and housing the wound product in the battery case 120.

Figure 2:
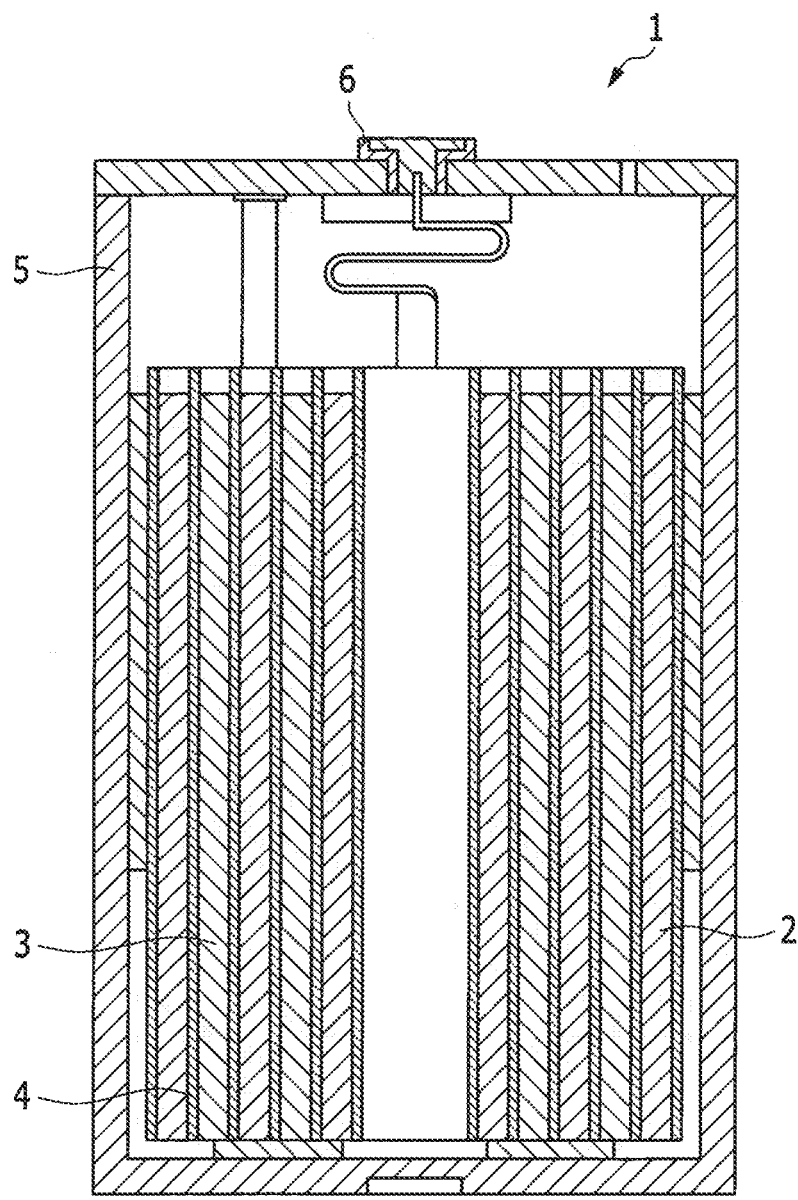
FIG. 2 is a cross-sectional view of a rechargeable lithium battery according to another embodiment.

FIG. 2 is a cross-sectional view of a prismatic rechargeable lithium battery. Referring to FIG. 2, the rechargeable lithium battery 1 includes an electrode assembly including a negative electrode 2, a positive electrode 3, and a separator 4 between the negative electrode 2 and the positive electrode 3. A battery case 5 houses the electrode assembly, an electrolyte is injected into the case from the top, and a cap plate 6 seals the battery case 5.

The rechargeable lithium battery may have a cylindrical or prismatic shape, as described above, but is not limited thereto, and may have any shape (such as a cylinder, a coin, a pouch, or the like) as long as it includes a separator for a rechargeable lithium battery and basically works as a battery. The negative electrode for a rechargeable lithium battery includes a current collector and a negative active material layer formed on the current collector, and the negative active material layer includes a negative active material.

The negative active material may include a material that reversibly intercalates/deintercalates lithium ions, lithium metal, a lithium metal alloy, a material capable of doping/dedoping lithium, or a transition metal oxide. The material that reversibly intercalates/deintercalates lithium ions may be a carbon material. The carbon material may be any carbon-based negative active material generally used in lithium ion rechargeable batteries. Examples of the carbon material include crystalline carbon, amorphous carbon, and a combination thereof. The crystalline carbon may be non-shaped, or sheet, flake, spherical, or fiber shaped natural graphite or artificial graphite. The amorphous carbon may be a soft carbon, a hard carbon, a mesophase pitch carbonized product, fired coke, or the like.

The lithium metal alloy includes lithium and at least one metal selected from Na, K, Rb, Cs, Fr, Be, Mg, Ca, Sr, Si, Sb, Pb, In, Zn, Ba, Ra, Ge, Al, or Sn. Examples of the material capable of doping/dedoping lithium include Si, $SiO_x$ (0<x<2), a Si—C composite, a Si-Q alloy (where Q is an alkali metal, an alkaline-earth metal, a Group 13 to 16 element, a transition element, a rare earth element, or a combination thereof, but is not Si), Sn, $SnO_2$, a Sn—C composite, Sn—R (where R is an alkali metal, an alkaline-earth metal, a Group 13 to 16 element, a transition element, a rare earth element, or a combination thereof, but is not Sn), and the like. Exemplary elements for Q and R include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition metal oxide may be vanadium oxide, lithium vanadium oxide, or the like.

The negative active material layer may include a binder and optionally further include a conductive material. The binder improves the binding properties of the negative active material particles with one another and with the current collector. Examples of the binder include polyvinylalcohol, carboxymethylcellulose, hydroxypropylcellulose, polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like, but are not limited thereto.

The conductive material is included to improve electrode conductivity. Any electrically conductive material may be used as a conductive material so long as it does not cause a chemical change. Examples of the conductive material include carbon-based materials such as natural graphite, artificial graphite, carbon black, acetylene black, ketjen black, carbon fibers, and the like; metal-based materials such as metal powders or metal fibers including copper, nickel, aluminum, silver, or the like; conductive polymers such as polyphenylene derivatives; or mixtures thereof.

The current collector may be a copper foil, a nickel foil, a stainless steel foil, a titanium foil, a nickel foam, a copper foam, a polymer substrate coated with a conductive metal, or a combination thereof.

The positive electrode of the rechargeable lithium battery includes a current collector and a positive active material layer disposed on the current collector. The positive active material includes a compound that reversibly intercalates and deintercalates lithium ions (i.e., a lithiated intercalation compound). The positive active material may include a composite oxide including lithium and at least one selected from cobalt, manganese, and nickel. In particular, the following compounds may be used:

$Li_aA_{1-b}R_bD_2$ (0.90≤a≤1.8 and 0≤b≤0.5);
$Li_aE_{1-b}R_bO_{2-c}D_c$ (0.90≤a≤1.8, 0≤b≤0.5 and 0≤c≤0.05);
$LiE_{2-b}R_bO_{4-c}D_c$ (0≤b≤0.5, 0≤c≤0.05);
$Li_aNi_{1-b-c}Co_bR_cD_\alpha$ (0.90≤a≤1.8, 0≤b≤0.5, 0≤c≤0.05 and 0≤α≤2);
$Li_aNi_{1-b-c}Co_bR_cO_{2-\alpha}Z_\alpha$ (0.90≤a≤1.8, 0≤b≤0.5, 0≤c≤0.05 and 0≤α≤2);
$Li_aNi_{1-b-c}Co_bR_cO_{2-\alpha}Z_2$ (0.90≤a≤1.8, 0≤b≤0.5, 0≤c≤0.05 and 0≤α≤2);
$Li_aNi_{1-b-c}Mn_bR_cD_\alpha$ (0.90≤a≤1.8, 0≤b≤0.5, 0≤c≤0.05 and 0≤α≤2);
$Li_aNi_{1-b-c}Mn_bR_cD_{2-\alpha}Z_2$ (0.90≤a≤1.8, 0≤b≤0.5, 0≤c≤0.05 and 0≤α≤2);
$Li_aNi_{1-b-c}Mn_bR_cO_{2-\alpha}Z_2$ (0.90≤a≤1.8, 0≤b≤0.5, 0≤c≤0.05 and 0≤α≤2);
$Li_aNi_bE_cG_dO_2$ (0.90≤a≤1.8, 0≤b≤0.9, 0≤c≤0.5 and 0.001≤d≤0.1);
$Li_aNi_bCo_cMn_dGeO_2$ (0.90≤a≤1.8, 0≤b≤0.9, 0≤c≤0.5, 0≤d≤0.5, 0.001≤e≤0.1);
$Li_aNiG_bO_2$ (0.90≤a≤1.8 and 0.001≤b≤0.1);
$Li_aCoG_bO_2$ (0.90≤a≤1.8 and 0.001≤b≤0.1);
$Li_aMnG_bO_2$ (0.90≤a≤1.8 and 0.001≤b≤0.1);
$Li_aMn_2G_bO_4$ (0.90≤a≤1.8 and 0.001≤b≤0.1);
$QO_2$;
$QS_2$;
$LiQS_2$,
$V_2O_5$;
$LiV_2O_5$;
$LiTO_2$;
$LiNiVO_4$;
$Li_{(3-f)}J_2(PO_4)_3$ (0≤f≤2);
$Li_{(3-f)}Fe_2(PO_4)_3$ (0≤f≤2); and
$LiFePO_4$.

In the above chemical formulae, A is Ni, Co, Mn, or a combination thereof. R is Al, Ni, Co, Mn, Cr, Fe, Mg, Sr, V, a rare earth element, or a combination thereof. D is O, F, S, P, or a combination thereof. E is Co, Mn, or a combination thereof. Z is F, S, P, or a combination thereof. G is Al, Cr, Mn, Fe, Mg, La, Ce, Sr, V, or a combination thereof. Q is Ti, Mo, Mn, or a combination thereof. T is Cr, V, Fe, Sc, Y, or a combination thereof. J is V, Cr, Mn, Co, Ni, Cu, or a combination thereof.

The compound may have a coating layer on the surface or may be mixed with a compound having a coating layer. The coating layer may include at least one coating element compound selected from oxides of a coating element, hydroxides of a coating element, oxyhydroxides of a coating element, oxycarbonates of a coating element, and hydroxylcarbonates of a coating element. The compounds for the coating layer can be amorphous or crystalline. The coating element for the coating layer may include Mg, Al, Co, K, Na, Ca, Si, Ti, V, Sn, Ge, Ga, B, As, Zr, or a mixture thereof. The coating layer can be formed by any method so long as there is no negative influence on the properties of the positive active material by including the element(s) in the compound. For example, the method may include any coating method such as spray coating, dipping, and the like, which are known to those who work in the related field.

The positive active material layer may include a binder and a conductive material. The binder improves the binding properties of the positive active material particles to one another and to the current collector. Nonlimiting examples of the binder include polyvinylalcohol, carboxymethylcellulose, hydroxypropylcellulose, diacetylcellulose, polyvinylchloride, carboxylated polyvinylchloride, polyvinylfluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like.

The conductive material is used to provide conductivity to the electrode. The conductive material may include any electrically conductive material as long as it does not cause a chemical change. Examples of the conductive material include one or a mixture of a conductive material such as natural graphite, artificial graphite, carbon black, acetylene black, ketjen black, a carbon fiber, a metal powder, a metal fiber or the like such as copper, nickel, aluminum, silver or the like, or a polyphenylene derivative or the like.

The current collector may be Al but is not limited thereto.

The negative and positive electrodes may each be fabricated by mixing the active material, conductive material, and binder to prepare an active material composition, and coating the composition on a current collector. The electrode manufacturing method is known. The solvent includes N-methylpyrrolidone or the like but is not limited thereto.

The electrolyte includes a non-aqueous organic solvent and a lithium salt. The non-aqueous organic solvent serves as a medium for transmitting ions taking part in the electrochemical reaction of the battery. The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran and tetrahydrofuran. Examples of the ketone-based solvent include cyclohexanone, and the like. Examples of the alcohol-based solvent include ethyl alcohol, isopropyl alcohol, and the like. Examples of the aprotic solvent include nitriles such as R—CN (where R is a C2 to C20 linear, branched, or cyclic hydrocarbon group including a double bond, an aromatic ring, or an ether bond), amides such as dimethylformamide, dioxolanes such as 1,3-dioxolane, sulfolanes, or the like.

A single non-aqueous organic solvent may be used, or a mixture of solvents may be used. When a mixture of organic solvents is used, the mixing ratio can be controlled in accordance with the desired battery performance.

The carbonate-based solvent may be prepared by mixing a cyclic carbonate and a linear carbonate. The cyclic carbonate and the linear carbonate may be mixed together in a volume ratio of about 1:1 to about 1:9. Within this range, electrolyte performance may be improved.

In some embodiments, the non-aqueous organic electrolyte may include a mixture of a carbonate-based solvent with an aromatic hydrocarbon-based solvent. The carbonate-based and the aromatic hydrocarbon-based solvents may be mixed together in a volume ratio ranging from about 1:1 to about 30:1. The aromatic hydrocarbon-based organic solvent may be represented by the following Chemical Formula 2.

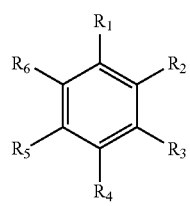

Chemical Formula 2

In Chemical Formula 2, $R_1$ to $R_6$ are each independently hydrogen, a halogen, a C1 to C10 alkyl group, a C1 to C10 haloalkyl group, or a combination thereof.

The aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

As an additive to improve cycle-life, the non-aqueous electrolyte may further include vinylene carbonate, an ethylene carbonate-based compound represented by the following Chemical Formula 3, or a combination thereof.

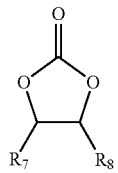

Chemical Formula 3

In Chemical Formula 3, $R_7$ and $R_8$ are each independently selected from hydrogen, heavy hydrogen, halogen, a cyano group (CN), a nitro group ($NO_2$), or a C1 to C5 fluoroalkyl group, provided that at least one of $R_7$ and $R_8$ is not hydrogen or heavy hydrogen. Specifically, at least one of $R_7$ and $R_8$ is selected from halogen, a cyano group (CN), a nitro group ($NO_2$), or a C1 to C5 fluoroalkyl group. Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the vinylene carbonate or the ethylene carbonate-based compound used to improve cycle-life may be adjusted within an appropriate range.

The lithium salt is dissolved in an organic solvent, supplies lithium ions in the battery, enables the basic operation of the rechargeable lithium battery, and improves lithium ion transportation between the positive and negative electrodes. Examples of the lithium salt include supporting electrolytic salts, such as $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, (where x and y are natural numbers), LiCl, LiI, $LiB(C_2O_4)_2$ (lithium bis(oxalato) borate, LiBOB), or a combination thereof.

The lithium salt may be used in a concentration ranging from about 0.1 M to about 2.0 M. When the lithium salt is included at this concentration range, the electrolyte may have good performance and lithium ion mobility due to optimal electrolyte conductivity and viscosity.

The separator 113 may include any material commonly used in conventional lithium batteries, as long as it separates the negative electrode 112 from the positive electrode 114 and provides a transporting passage for lithium ions. In other words, the separator may have low resistance against ion transportation and good electrolyte impregnation. For example, the separator may be selected from glass fiber, polyester, TEFLON (tetrafluoroethylene), polyethylene, polypropylene, polytetrafluoroethylene (PTFE), or a combination thereof. The separator may be a non-woven fabric or a woven fabric. For example, for a lithium ion battery, a polyolefin-based polymer separator such as polyethylene, polypropylene or the like may be used. In order to ensure heat resistance or mechanical strength of the lithium ion battery, a coated separator including a ceramic component or a polymer material may be used. The separator may have a single layer or multiple layers.

According to embodiments of the present invention, the rechargeable lithium battery may further include 1,3-propane sultone (PS), which has been conventionally used for increasing thermal impact durability, as well as the compound represented by Chemical Formula 1. According to an embodiment of the present invention, the rechargeable lithium battery including the compound represented by Chemical Formula 1 has remarkably increased thermal impact durability due to the inclusion of the compound, and thus may include little or no 1,3-propane sultone (PS) (which has been conventionally used to improve thermal impact durability, but may cause cancer).

The following examples further illustrate the present invention. These examples are presented for illustrative purposes only, and should not in any sense be interpreted as limiting the scope of the present invention.

Examples 1-9: Fabrication of Rechargeable Lithium Battery Cell

Rechargeable lithium battery cells according to Examples 1 to 9 were fabricated using $LiMnO_2$ as a positive electrode, graphite as a negative electrode, and an electrolyte solution having a mixture of ethylenecarbonate (EC), ethyl methyl carbonate (EMC), and diethyl carbonate (DEC) in a volume ratio of 3:5:2 as a solvent and the composition indicated in the following Table 1. The electrolyte was prepared by mixing the solvent and then dissolving 0.95M of $LiPF_6$ in the mixed solvent, and then adding 6 parts by weight of FEC (fluoroethylene carbonate), 0.5 parts by weight of VEC (vinyl ethylene carbonate), and 0.2 parts by weight of $LiBF_4$ as electrolyte additives thereto based on 100 parts by weight of the electrolyte. Also, SN (succinonitrile), PS (1,3-propane sultone), 3-MSPN (3-methanesulfonylpropionitrile), and/or 1,3,6-HTCN (1,3,6-Hexane Tri-Cyanide) were respectively added (as indicated in Table 1) in an amount of 1 to 3 parts by weight.

TABLE 1

|  | FEC (parts by weight) | VEC (parts by weight) | LBF (parts by weight) | PS (parts by weight) | SN (parts by weight) | 3-MSPN (parts by weight) | 1,3,6-HTCN (parts by weight) |
|---|---|---|---|---|---|---|---|
| Example 1 | 6 | 0.5 | 0.2 | 1 | 3 | 0 | 0 |
| Example 2 | 6 | 0.5 | 0.2 | 2 | 3 | 0 | 0 |
| Example 3 | 6 | 0.5 | 0.2 | 2 | 2 | 0 | 0 |
| Example 4 | 6 | 0.5 | 0.2 | 0 | 3 | 0 | 0 |
| Example 5 | 6 | 0.5 | 0.2 | 0 | 3 | 1 | 0 |
| Example 6 | 6 | 0.5 | 0.2 | 0 | 2 | 1 | 0 |
| Example 7 | 6 | 0.5 | 0.2 | 1 | 1 | 0 | 2 |
| Example 8 | 6 | 0.5 | 0.2 | 1 | 0 | 0 | 3 |
| Example 9 | 6 | 0.5 | 0.2 | 0 | 0 | 0 | 3 |

Experimental Example 1: Thermal Impact Characteristic Test

The rechargeable lithium battery cells according to Examples 1 and 4 to 9 were tested for thermal impact in order to compare the thermal impact characteristics of batteries including electrolytes with different kinds of additives. The results are provided in the following Table 2. The thermal impact test was performed by repetitively (30 times) heating and cooling the rechargeable lithium battery cells from 80° C. to −40° C. for one hour to apply stress. Then, the rechargeable lithium battery cells were allowed to stand at room temperature (after applying thermal impact stress) and then measured for increased thickness rate relative to an initial thickness (Ini. ΔT (%)), an increased thickness rate relative to a maximum increased thickness (Max. ΔT (%)), an increased thickness (mm) relative to the maximum increased thickness (Max. T (mm)), an increased thickness rate relative to a desired thickness (Abs. ΔT (%)), and capacity retention and recovery capacity.

The capacity retention (%) of the rechargeable lithium battery cells was calculated by measuring rated capacity before the test, discharge capacity after the test (by charging the rechargeable lithium batteries by the same method), and calculating "discharge capacity/rated capacity×100".

The recovery capacity (%) of the rechargeable lithium battery cells was evaluated by performing rated charge and discharge and calculating "discharge capacity/rated capacity×100" after measuring the capacity retention. The results are provided in the following Table 2.

TABLE 2

|  | Ini. ΔT (%) | Max. ΔT (%) | Max. T(mm) | Abs. ΔT (%) | Retention | Recovery |
|---|---|---|---|---|---|---|
| Example 1 | 9.31% | 10.20% | 4.98 | 5.22% | 81.5% | 86.2% |
| Example 4 | 18.76% | 25.81% | 5.67 | 14.18% | 76.2% | 81.0% |
| Example 5 | 16.62% | 17.83% | 5.31 | 11.78% | 77.7% | 82.9% |
| Example 6 | 16.01% | 18.10% | 5.32 | 11.53% | 78.8% | 83.7% |
| Example 7 | 7.19% | 7.54% | 4.89 | 3.33% | 84.9% | 89.8% |
| Example 8 | 6.56% | 6.82% | 4.75 | 3.87% | 85.2% | 90.2% |
| Example 9 | 4.35% | 5.89% | 3.89 | 2.96% | 88.2% | 92.5% |

As shown in Table 2, the rechargeable lithium battery cell including 1,3,6-HTCN (1,3,6-Hexane Tri-Cyanide) represented by Chemical Formula 1 according to Examples 7 to 9 had improved results (including the increased thickness rate relative to an initial thickness (Ini. ΔT (%)), the increased thickness rate relative to the maximum increased thickness (Max. ΔT (%)), the increased thickness (mm) relative to the maximum increased thickness (Max. T (mm)), the increased thickness rate relative to a desired thickness (Abs. ΔT (%)), and retention and recovery rate after thermal impact) compared to the cell including no BMSE (Bismethanesulfonylethane), 3-MSPN (3-methanesulfonylpropionitrile) or 1,3,6-HTCN according to Example 1, or the cells including no 1,3,6-HTCN according to Examples 4 to 6.

Accordingly, the battery cells including the 1,3,6-HTCN compound represented by Chemical Formula 1 exhibited improved thermal impact characteristics.

Experimental Example 2: Thermal Impact Characteristic Comparison Using Similar Compound Succinonitrile (SN, $C_2H_4(CN)_2$) and adiponitrile (AN, $(CH_2)_4(CN)_2$) have been conventionally used as additives for rechargeable lithium batteries, and have structures similar to HTCN (hexane tricarbonate), which is a compound represented by Chemical Formula 1. In order to predict surface stabilization effects, side reaction suppression effects, and bonding strength with metal ions of a positive electrode, the coordination bonding energies of succinonitrile (SN, $C_2H_4(CN)_2$), adiponitrile (AN, $(CH_2)_4(CN)_2$) and 1,3,6-HTCN (hexane tricarbonate) between the surface of the positive electrode (LCO) and an electrode active material was quantum-chemically calculated through density functional theory (DFT) using a PAW (projector augmented wave) method and a PBE (perdew Burke Ernzerhof) function. As a result, 1,3,6-HTCN (a compound represented by Chemical Formula 1) turned out to be bonded on the surface of the positive electrode (LCO) with about 3.9 and 7.3 kcal/mol higher bonding strength than the conventional additives, succinonitrile (SN, $C_2H_4(CN)_2$) and adiponitrile (AN, $(CH_2)_4(CN)_2$), respectively. The results are provided in Table 3.

TABLE 3

| compound | Eads (kcal/mol) | ΔEads | O.P. (V)* |
|---|---|---|---|
| SN | −12.937 | 0.000 | 6.43 |
| AN | −9.570 | −3.367 | 6.05 |
| 1,3,6-HTCN | −16.857 | 3.920 | 6.28 |

*indicates the oxidation potential (volt).

In addition, the complex compound formation energies of 1,3,6-HTCN were calculated with respect to various metal ions, which exist as free ions (PBEO/6-311+g(d,p)). These calculations showed that 1,3,6-HTCN was strongly bonded with ions such as $Co^{3+}$, $Ni^{2+}$, $Fe^{2+}$, $Mn^{4+}$, $Cu^+$, and the like, and suppresses short circuits caused by extraction due to metal impurities in a battery cell on the surface of the negative electrode, like SN or AN. The binding energy with metal ions is provided in the following Table 4.

TABLE 4

| | | De (kcal/mol) | | | | | | | |
|---|---|---|---|---|---|---|---|---|---|
| | | $Co^{3+}$ | Δ | $Ni^{2+}$ | Δ | $Fe^{2+}$ | Δ | $Mn^{4+}$ | Δ | $Cu^+$ |
| SN | 3* | 806.36 | 0 | 345.85 | 0 | 313.32 | 0 | 502.29 | 0 | — |
| AN | 3* | 814.58 | 8.22 | 395.67 | 49.81 | 359.76 | 46.44 | 1643.56 | 1141.3 | |
| 1,3,6-HTCN | 2* | 791.00 | −15.36 | 385.25 | 39.4 | 350.11 | 36.79 | 1602.66 | 1100.4 | 136.61 |

*indicates the number of compounds forming a complex compound with the surface of an active material or a metal ion Without being bound with a specific theory, it is believed that the differences in the binding energies are caused by the fact that the compound of Chemical Formula 1 (having 3 to 9 CN functional groups and having k, l, and m, which are different from one another and are independently integers of 0 to 20) has an asymmetric structure, which allows the compound to form a stronger coordination bond with the metal ion on the surface of the active material or other metal ions in the battery than the SN or AN compounds, which have symmetric structures.

FIGS. 3 and 4 are schematics showing the respective bonding shapes of these compounds with an electrode surface material, and the coordination bonding shapes with metal ions. Referring to FIGS. 3 and 4, the compound represented by Chemical Formula 1 (1,3,6-HTCN) according to embodiments of the present invention has a stronger bond with the active material on the surface of the electrode or metal ions in a battery cell than conventional compounds having symmetric structures, such as SN or AN. In order to confirm this effect, the following battery cells according to Examples 10 to 16 were additionally fabricated.

Examples 10-16: Fabrication of Rechargeable Lithium Battery Cells

Rechargeable lithium battery cells according to Examples 10 to 16 were fabricated using $LiMnO_2$ as a positive electrode, graphite as a negative electrode, and an electrolyte solution prepared by mixing ethylenecarbonate (EC), ethyl methyl carbonate (EMC), and diethyl carbonate (DEC) in a volume ratio of 3:5:2 as a solvent and dissolving 0.95M of $LiPF_6$ therein, and then adding 6 parts by weight of FEC (fluoroethylene carbonate), 0.5 parts by weight of VEC (vinyl ethylene carbonate), and 0.2 parts by weight of $LiBF_4$ as electrolyte additives based on 100 parts by weight of the electrolyte. Also, SN (succinonitrile) and PS (1,3-propane sultone) were added in an amount of 0 to 4 parts by weight according to according to Table 5 below. Additionally, 1,3,6-HTCN (1,3,6-hexane Tri-Cyanide) in an amount of 1 to 3 parts by weight, or 1,3,5-PTCN (1,3,5-penta Tri-Cyanide) in an amount of 1 parts by weight was added according to Table 5 below. Both 1, 2, 3-PTCN and 1,3,5-PTCN are similar to 1, 3, 6-HTCN in that they all are hydrocarbon compounds having three CN functional groups. However, 1, 2, 3-PTCN and 1,3,5-PTCN have symmetric molecular structures, unlike 1,3,6-HTCN.

The rechargeable lithium battery cell according to Example 10 was used as a control group since it included neither 1,3,6-HTCN nor a compound having a symmetric structure. The compositions of the electrolyte additives according to the Examples are provided in the following Table 5, and the rechargeable lithium batteries including the additives were tested to ascertain thermal impact characteristics as in Experimental Example 1. The results are provided in Table 6. In the following Table 5, the listed amounts of each additive or solvent are reported as parts by weight.

TABLE 5

| | FEC | VEC | LBF | PS | SN | 1,3,6-HTCN | 1,2,3-PTCN | 1,3,5-PTCN |
|---|---|---|---|---|---|---|---|---|
| Example 10 | 6 | 0.5 | 0.2 | 2 | 4 | 0 | 0 | 0 |
| Example 11 | 6 | 0.5 | 0.2 | 3 | 0 | 1 | 0 | 0 |
| Example 12 | 6 | 0.5 | 0.2 | 3 | 0 | 2 | 0 | 0 |
| Example 13 | 6 | 0.5 | 0.2 | 3 | 0 | 3 | 0 | 0 |
| Example 14 | 6 | 0.5 | 0.2 | 3 | 1 | 2 | 0 | 0 |
| Example 15 | 6 | 0.5 | 0.2 | 1 | 2 | 0 | 1 | 0 |
| Example 16 | 6 | 0.5 | 0.2 | 1 | 2 | 0 | 0 | 1 |

TABLE 6

| | Ini. ΔT (%) | Max. ΔT (%) | Max. T(mm) | Abs. ΔT (%) | Retention | Recovery |
|---|---|---|---|---|---|---|
| Example 10 | 9.41% | 10.30% | 5.023 | 6.23% | 80.5% | 83.3% |
| Example 11 | 8.38% | 9.89% | 5.011 | 5.80% | 84.9% | 87.8% |
| Example 12 | 5.72% | 6.88% | 4.650 | 2.38% | 84.5% | 88.5% |
| Example 13 | 5.15% | 5.89% | 4.755 | 1.44% | 87.4% | 91.3% |
| Example 14 | 5.65% | 6.32% | 4.532 | 2.77% | 85.5% | 90.5% |

TABLE 6-continued

|  | Ini. ΔT (%) | Max. ΔT (%) | Max. T(mm) | Abs. ΔT (%) | Retention | Recovery |
|---|---|---|---|---|---|---|
| Example 15 | 17.11% | 17.76% | 5.330 | 12.70% | 76.9% | 80.2% |
| Example 16 | 16.62% | 17.83% | 5.319 | 11.53% | 78.8% | 83.7% |

As shown in Table 6, when 1,3,6-HTCN (represented by Chemical Formula 1) was used as an additive (Examples 11 to 14) the batteries had improved effects in terms of increased thickness rate relative to initial thickness, increased thickness rate relative to the maximum increased thickness, capacity retention, and recovery capacity after thermal impact as compared with the Examples including no 1,3,6-HTCN (Example 10) and Examples including 1,2,3-PTCN or 1,3,5-PTCN having similar, but symmetric structures (Examples 15 and 16).

Experimental Example 3: Coordination Binding Energies Between Compounds on a Surface of an Electrode and Electrode Active Material The coordination binding energies of 1,2,3-PTCN, 1,3,5-PTCN, 1,3,6-HTCN, and 1,2,6-HTCN between the compounds on the surface of the positive electrode ($LiMnO_2$) and the electrode active material were quantum-chemically calculated through a density functional theory (DFT) using a PAW (projector augmented wave) method and a PBE function in order to predict the surface stabilization effect of the positive electrode, the suppression effects of side reactions, and the bonding strengths with metal ions. The results are provided in the following Table 7. Herein, the results of SN compound are also provided for comparison.

TABLE 7

| Compound | Eads (kcal/mol) |
|---|---|
| SN | −12.937 |
| 1,2,3-PTCN | 638.54 |
| 1,3,5-PTCN | −11.29 |
| 1,3,6-HTCN | −16.857 |
| 1,2,6-HTCN | −14.595 |

As shown in Table 7, 1,3,6-HTCN and 1,2,6-HTCN (compounds represented by Chemical Formula 1) are bonded on the surface of the positive electrode ($LiMnO_2$) with higher bonding strength than 1,2,3-PTCN or 1,3,5-PTCN, which have similar but symmetric structures.

In addition, FIG. 5 is a schematic showing the bonding shapes of the compounds with the surface of the electrode material. As shown in FIG. 5, the compounds (1,3,6-HTCN and 1,2,6-HTCN) represented by Chemical Formula 1 according to embodiments of the present invention are more stably bonded on the surface of the positive electrode (LCO) than 1,2,3-PTCN or 1,3,5-PTCN, which have similar but symmetric structures.

Rechargeable lithium battery cells including the compound represented by Chemical Formula 1 have remarkably improved thermal impact durability since the compound represented by Chemical Formula 1 is bonded with the electrode surface material and suppresses gas generation on the surface of the positive electrode. In addition, the battery cells have coordination bonds of the compound represented by Chemical Formula 1 with metal ions, thus preventing short circuits due to extraction of the metal ions on the surface of the negative electrode. Accordingly, rechargeable lithium batteries including the compound represented by Chemical Formula 1 may replace rechargeable lithium batteries including PS (a conventional additive used to improve thermal impact durability, but that possibly causes cancer).

While the present invention has been illustrated and described in connection with certain exemplary embodiments, it is to be understood that the invention is not limited to the disclosed embodiments, but, on the contrary, is intended to cover various modifications and equivalent arrangements included within the spirit and scope of the appended claims.

What is claimed is:
1. A rechargeable lithium battery, comprising:
a positive electrode;
a negative electrode;
an electrolyte; and
a compound represented by Chemical Formula 1 in at least one of the positive electrode, the negative electrode or the electrolyte:

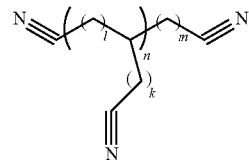

Chemical Formula 1 wherein:
each of k, l and m is independently an integer of 0 to 20, and each of k, l and m are different from each other such that the compound of Chemical Formula 1 has an asymmetric structure, and
n is an integer of 1 to 7; and
wherein the compound represented by Chemical Formula 1 is present in the positive electrode, the negative electrode or the electrolyte in an amount of about 0.1 to about 10% based on a total weight of the positive electrode, the negative electrode or the electrolyte in which the compound represented by Chemical Formula 1 is present.

2. The rechargeable lithium battery of claim 1, wherein n is an integer of 1 to 5, and k, l and m are independently integers of 0 to 10.

3. The rechargeable lithium battery of claim 1, wherein n is an integer of 1 to 3, and k, l and m are independently integers of 0 to 7.

4. The rechargeable lithium battery of claim 1, wherein n is 1 or 2, k is 0, and l and m are independently integers of 1 to 5.

5. The rechargeable lithium battery of claim 1, wherein the compound represented by Chemical Formula 1 is 1,3,6-Hexane Tri-Cyanide (1,3,6-tricyanohexane; 1,3,6-HTCN) or 1,2,6-Hexane Tri-Cyanide (1,2,6-tricyanohexane; 1,2,6-HTCN).

6. An electrode composition, comprising:
an electrode active material; and
a compound represented by Chemical Formula 1:

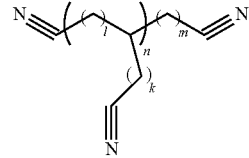

Chemical Formula 1 wherein:
each of k, l and m is independently an integer of 0 to 20, and each has a different value from the other; and
k, l and m are selected such that the compound of Chemical Formula 1 has an asymmetric structure, and
n is an integer of 1 to 7, and wherein the compound represented by Chemical Formula 1 is present in the electrode composition in an amount of about 0.1 to about 10% based on a total weight of the electrode composition.

7. The electrode composition of claim 6, wherein the electrode active material is a positive active material.

8. The electrode composition of claim 6, wherein the electrode active material is a negative active material.

9. The electrode composition of claim 6, wherein n is an integer of 1 to 5, and k, l and m are independently integers of 0 to 10.

10. The electrode composition of claim 6, wherein n is an integer of 1 to 3, and k, l and m are independently integers of 0 to 7.

11. The electrode composition of claim 6, wherein n is 1 or 2, k is 0, and l and m are independently integers of 1 to 5.

12. The electrode composition of claim 6, wherein the compound represented by Chemical Formula 1 is 1,3,6-Hexane Tri-Cyanide (1,3,6-tricyanohexane; 1,3,6-HTCN) or 1,2,6-Hexane Tri-Cyanide (1,2,6-tricyanohexane; 1,2,6-HTCN).

13. An electrolyte composition, comprising:
a solvent;
a lithium salt; and
a compound represented by Chemical Formula 1:

Chemical Formula 1

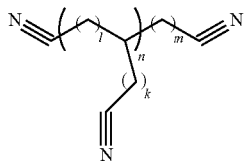

wherein:

each of k, l and m is independently an integer of 0 to 20, and each of k, l and m are different from each other such that the compound of Chemical Formula 1 has an asymmetric structure, and n is an integer of 1 to 7, and wherein the compound represented by Chemical Formula 1 is present in the electrolyte composition in an amount of about 0.1 to about 10% based on a total weight of the electrolyte composition.

14. The electrolyte composition of claim 13, wherein n is an integer of 1 to 5, and k, l and m are independently integers of 0 to 10.

15. The electrolyte composition of claim 13, wherein n is an integer of 1 to 3, and k, l and m are independently integers of 0 to 7.

16. The electrolyte composition of claim 13, wherein n is 1 or 2, k is 0, and l and m are independently integers of 1 to 5.

17. The electrolyte composition of claim 13, wherein the compound represented by Chemical Formula 1 is 1, 3, 6-Hexane Tri-Cyanide (1,3,6-tricyanohexane; 1, 3, 6-HTCN) or 1, 2, 6-Hexane Tri-Cyanide (1, 2, 6-tricyanohexane; 1, 2, 6-HTCN).

* * * * *